No. 749,967. PATENTED JAN. 19, 1904.
W. J. KEVILLE.
BRAKE SLACK ADJUSTER.
APPLICATION FILED APR. 4, 1903.
NO MODEL. 2 SHEETS—SHEET 2.
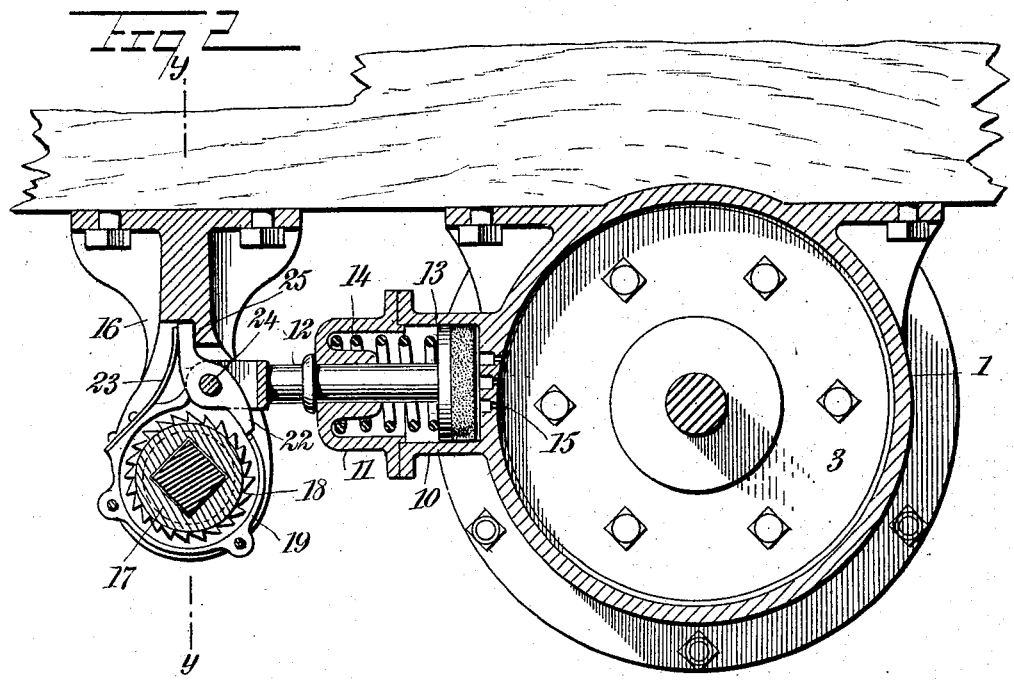
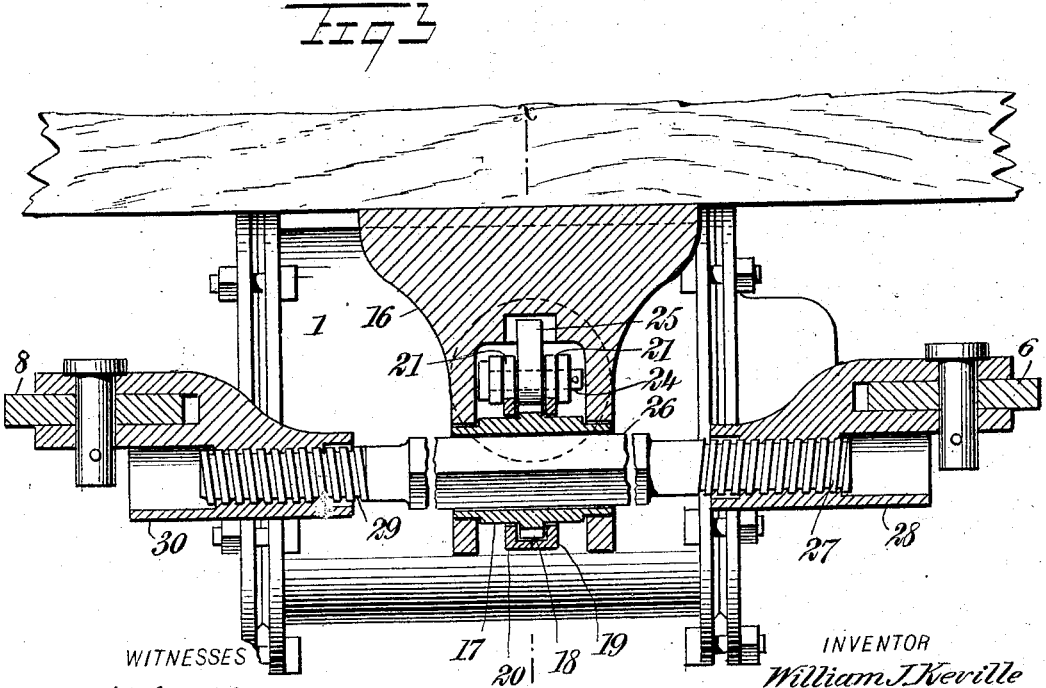
WITNESSES
H. Walker
C. R. Ferguson
INVENTOR
William J. Keville
BY
ATTORNEYS.

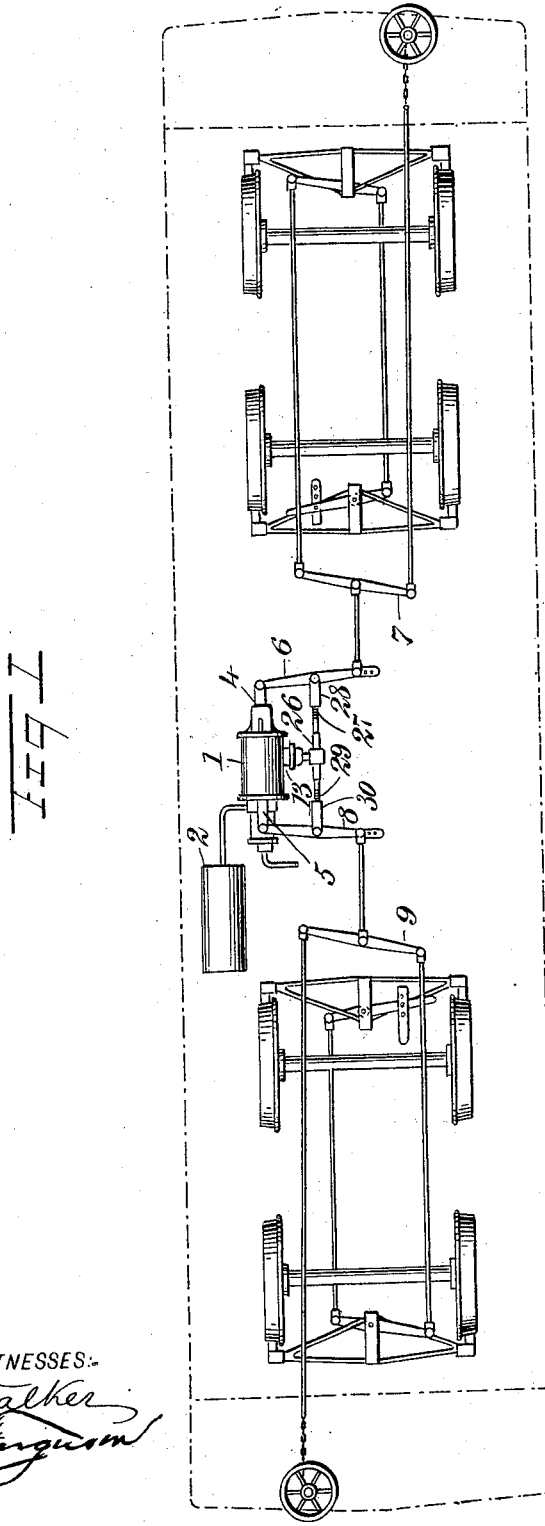

No. 749,967.

Patented January 19, 1904.

UNITED STATES PATENT OFFICE.

WILLIAM J. KEVILLE, OF DENVER, COLORADO, ASSIGNOR OF ONE-HALF TO FREDERICK E. BECK, OF DENVER, COLORADO.

BRAKE SLACK-ADJUSTER.

SPECIFICATION forming part of Letters Patent No. 749,967, dated January 19, 1904.

Application filed April 4, 1903. Serial No. 151,045. (No model.)

*To all whom it may concern:*

Be it known that I, WILLIAM J. KEVILLE, a citizen of the United States, and a resident of Denver, in the county of Denver and State of Colorado, have invented a new and Improved Brake Slack-Adjuster, of which the following is a full, clear, and exact description.

This invention relates to improvements in devices for taking up or adjusting the slack in railway-car air-brake mechanism, an object being to provide a simple device for this purpose that will automatically take up any slack that may occur through the wearing away of parts or other abnormal travel of the brake-operating system.

I will describe a brake slack-adjuster embodying my invention and then point out the novel features in the appended claims.

Reference is to be had to the accompanying drawings, forming a part of this specification, in which similar characters of reference indicate corresponding parts in all the figures.

Figure 1 is a plan view of a brake system, showing a slack-adjuster embodying my invention in connection therewith. Fig. 2 is a sectional view of the adjuster on the line $x$ $x$ of Fig. 3, and Fig. 3 is a section on the line $y$ $y$ of Fig. 2.

Referring to the drawings, 1 designates a brake-cylinder having connection with an air-cylinder 2 in the usual manner, and operating in the brake-cylinder is a piston 3, having a rod 4 extended outward through a head of the cylinder, and a rod 5 extends from the opposite head of the cylinder. The rod 4 is pivotally connected to one end of a lever 6 for actuating the brake mechanism 7 of one truck, and the rod 5 has connection with a similar lever 8 for operating the brake mechanism 9 of the other truck. Arranged on one side of the cylinder 1 is an auxiliary cylinder 10, which may be cast integral with said cylinder 1. This cylinder 10 is provided with a head 11, through which the stem 12 of the auxiliary piston 13 passes. For moving the piston 13 in one direction I employ a spring 14, arranged in the auxiliary cylinder and bearing at one end on the piston and on the other end against the head 11. The cylinder 10 communicates with the cylinder 1 through a plurality of small ports 15, these ports being arranged at a point to be covered by the piston 3 at the end of its normal stroke or travel; but should the said piston 3 pass beyond its normal stroke the ports 15 will be arranged to admit air-pressure against the piston 13 and the levers 6 and 8 will be adjusted as will be hereinafter described. I prefer to employ the series of small ports 15 instead of one or two large ports, because with these small ports there is less liability of wearing out or damaging the leather or other packing of the piston 3.

Supported in a hanger 16, depending from the bottom of the car, is a sleeve 17, having ratchet-teeth 18 on its periphery. Mounted loosely on the sleeve 17 at opposite sides of the ratchet-teeth are rings 19 20. These rings are removably connected together by means of pins or other suitable devices, and pivoted between lugs 21 on said rings is a pawl 22, designed for engaging with the ratchet-teeth 18, and this pawl 22 will be held yieldingly against the teeth by means of a spring 23, attached to one of the rings 19 or 20. The stem 12 of the piston 13 is connected with a pivot 24, on which said pawl 22 is mounted. Under ordinary circumstances the pawl 22 will be held out of engagement with the teeth 18 by the upper extension of said pawl engaging with a shoulder 25 on the hanger 16. The sleeve 17 is provided with an angular opening receiving the angular portion of an adjusting-rod 26, the said angular portion being loose in the sleeve, so that the rod may have a longitudinal movement with relation to the sleeve, but will turn therewith. One end of the rod 26 is provided with a left-hand thread 27 for engaging with a corresponding thread in a block 28, having pivotal connection with the brake-lever 6. The other end of said rod 26 is provided with a right-hand thread 29 for engaging a corresponding thread in a block 30, pivotally connected to the lever 8. By making the rod 26 movable in the sleeve, as above mentioned, the brake-levers may be operated under ordinary conditions without imparting lateral strain or movement on the ratchet-sleeve.

In operation, as before stated, the piston 3 at the end of its normal movement will close the ports 15; but should the piston travel become greater than normal air will be admitted to the auxiliary cylinder when the brakes are applied, said air, of course, passing from the cylinder 1 through the ports or openings 15. This air will force the piston 13 outward, compressing the spring 14, and this outward movement of the piston 13 will swing the rings 19 and 20, causing the pawl 22 to engage with one of the teeth 18, where it remains until the brakes are released, and the air in the cylinder 1 and in the auxiliary cylinder 10 is exhausted to the atmosphere. Then the spring 14 will force the piston 13 inward to its limit of movement, which will cause the pawl 22 to rotate the sleeve 17, whereby the threaded extremities of the rod 26 will be screwed into the blocks, drawing the outer ends of the levers 6 and 8 closer together, thus taking up the superfluous slack. This operation is repeated as often as the piston travel exceeds the normal. It is of the utmost importance that a uniform piston travel be maintained throughout the entire train, so that each car may receive its proper braking force, and with this object in view I have made the present invention.

Another important feature of this adjuster is that there is no piping used in connecting the air-cylinder to the adjusting-cylinder, such as is applied in other inventions of this nature where air is used as a motive force.

Having thus described my invention, I claim as new and desire to secure by Letters Patent—

1. The combination with a brake-cylinder, a piston therein and brake-levers operated by the piston, of an auxiliary cylinder attached to one side of the brake-cylinder and communicating with the brake-cylinder through a plurality of small ports formed in the wall of the braking-cylinder, a piston in the auxiliary cylinder, and means operated by said piston, for causing a relative adjustment between the brake-levers.

2. The combination with a brake-cylinder, a brake-piston therein, and brake-levers operated by the piston, of an auxiliary cylinder having port communication with the brake-cylinder and formed integral therewith, the said communication being at a point whereby it will be covered by the brake-piston at the end of its normal travel, a piston in the auxiliary cylinder, and means adapted to be operated by said piston, for causing a relative adjustment between the brake-levers.

3. In a brake system, a brake-cylinder, a brake-piston therein, brake-levers operating at opposite sides of said piston, an auxiliary cylinder communicating with the brake-cylinder, a piston in the auxiliary cylinder, a sleeve having ratchet-teeth, a rod extended loosely through said sleeve whereby it may be moved longitudinally but will rotate with the sleeve, the said rod having oppositely-disposed threaded ends, interiorly-threaded blocks for engaging said threaded ends, the said blocks being pivoted to the brake-levers, and a pawl operated by the piston in the auxiliary cylinder, for engaging with the ratchet-teeth.

4. The combination with a brake-cylinder, a brake-piston operating therein and brake-levers operating at opposite sides of the said piston, of an auxiliary cylinder having port communication with the brake-cylinder, a piston in said auxiliary cylinder, a spring in the cylinder for moving the piston in one direction, a ratchet-sleeve, rings loosely mounted on said sleeve on opposite sides of the ratchet-teeth, a pawl carried by said rings and having connection with the piston in the auxiliary cylinder, a rod movable through the ratchet-sleeve, but adapted to rotate therewith, the said rod having a left-hand thread at one end and a right-hand thread at the other end, and correspondingly-threaded blocks for engaging with said threads of the rod, the said blocks being pivotally connected to the brake-levers.

In testimony whereof I have signed my name to this specification in the presence of two subscribing witnesses.

WILLIAM J. KEVILLE.

Witnesses:
J. M. SHERMAN,
O. A. WHITTEMORE.